US008510223B2

(12) United States Patent
Blair et al.

(10) Patent No.: US 8,510,223 B2
(45) Date of Patent: Aug. 13, 2013

(54) MONEY TRANSFER TRANSACTIONS VIA PRE-PAID WIRELESS COMMUNICATION DEVICES

(75) Inventors: Paul Blair, Parker, CO (US); Rex Lieurance, Des Moines, IA (US); Diane Scott, Lone Tree, CO (US)

(73) Assignee: The Western Union Company, Englewood, CO (US)

( * ) Notice: Subject to any disclaimer, the term of this patent is extended or adjusted under 35 U.S.C. 154(b) by 592 days.

(21) Appl. No.: 11/462,223

(22) Filed: Aug. 3, 2006

(65) Prior Publication Data

US 2008/0033877 A1 Feb. 7, 2008

(51) Int. Cl.
*G06Q 40/00* (2012.01)
(52) U.S. Cl.
USPC .......................................................... 705/44
(58) Field of Classification Search
USPC ...................................... 705/35–45
See application file for complete search history.

(56) References Cited

U.S. PATENT DOCUMENTS

| | | | | |
|---|---|---|---|---|
| 5,884,290 | A * | 3/1999 | Smorodinsky et al. | 705/44 |
| 6,206,283 | B1 * | 3/2001 | Bansal et al. | 235/379 |
| 6,424,845 | B1 * | 7/2002 | Emmoft et al. | 455/575.1 |
| 6,816,721 | B1 * | 11/2004 | Rudisill | 455/406 |
| 2002/0055907 | A1 | 5/2002 | Pater et al. | |
| 2002/0073044 | A1 | 6/2002 | Singhal | |
| 2002/0116331 | A1 | 8/2002 | Cataline et al. | |
| 2002/0138423 | A1 * | 9/2002 | Takatori et al. | 705/39 |
| 2003/0126079 | A1 * | 7/2003 | Roberson et al. | 705/40 |
| 2004/0098353 | A1 * | 5/2004 | Smith, III | 705/75 |
| 2007/0078763 | A1 * | 4/2007 | Babi et al. | 705/39 |
| 2008/0103972 | A1 * | 5/2008 | Lanc | 705/44 |

OTHER PUBLICATIONS

G-Cash: Remittances Find a New Vehicle in Mobile Phones, http://www.nextbillion.net/node/1733/print.

* cited by examiner

*Primary Examiner* — Daniel Felten
*Assistant Examiner* — Clifford Madamba
(74) *Attorney, Agent, or Firm* — Kilpatrick Townsend & Stockton, LLP

(57) ABSTRACT

The present invention generally provides systems and methods for performing money transfer transactions via a wireless communication device, such as a cellular phone. In accordance with the invention, the wireless communication device is associated with, or automatically linked to, at least one payment source account (i.e., the wireless communication device is associated with a payment source account that may be automatically charged for payment of account balances, authorized charges, and/or money transfers). In a preferred embodiment, the wireless communication device is associated with at least one pre-paid payment source account. In one example, the wireless communication device is a pre-paid cellular phone and/or is associated with a pre-paid money transfer account. In certain aspects, the wireless communication device may access a pre-directed phone number, e.g., *55, to access a money transfer service provider. Once connected to a money transfer service provider, a user may initiate a money transfer via the wireless device, which is optionally paid to a payee in-person at a money transfer service provider location.

11 Claims, 2 Drawing Sheets

MONEY TRANSFER TRANSACTIONS VIA PRE-PAID WIRELESS COMMUNICATION DEVICES

BACKGROUND OF THE INVENTION

An ever-increasing amount of commerce is being done via automated technologies, and unique ways to send money are being devised to ease the flow of money for automated and online transactions. Inherent to automated and online transactions, the parties never meet in person such that the parties enjoy a certain amount of anonymity. Criminals find comfort in this anonymity which is reflected in the fraud statistics for online transactions.

To capitalize upon online commerce, while reducing the fraud risk, new methods of payment authentication have been devised. There are address verification services that check the address provided against the billing address with the credit card company. Modern credit cards have a card verification value (CVV) code imprinted on the back or front of the credit card that is not part of the credit card number (VISA™ refers to the code as CVV2, MasterCard™ calls it CVC2, and American Express™ calls it CID). Authenticating that the buyer has the proper CVV code tends to show the buyer physically has the card. Similarly, some authenticate the customer service number on the credit card.

Some credit cards have an embedded semiconductor chip that can have various features to reduce the risk of fraud. These new cards are called smart cards. A card reader is necessary at the Internet terminal the purchaser is using to take advantage of the smart card feature. In certain countries, the adoption of smart cards is at insignificant levels.

One type of online transaction subject to the above fraud concerns is the sending of money using online or telephone based payment to fund the transfer. For example, there are services offered by WesternUnion.com™ that allow using a credit/debit card to make money available for pickup at a retail Western Union™ location. As the money can be paid out almost immediately, authentication of the sender and their card is important to reduce the risk of fraud. Once the money is picked-up, the true owner of the card may dispute the charge leaving little chance of recovery.

As such, there is a need for systems and methods to ensure proper authentication of users and funding of money transfers in money transfer transaction initiated via the telephone.

BRIEF SUMMARY OF THE INVENTION

The present invention generally provides systems and methods for performing money transfer transactions via a wireless communication device, such as a cellular phone, blackberry, palm pilot, or similar personal communication device. In accordance with the invention, the wireless communication device is associated with, or automatically linked to, at least one automatic payment source account (i.e., the wireless communication device is associated with at least one payment source account that may be automatically charged for payment of account balances, authorized charges, money transfers, etc.). In a preferred embodiment, the wireless communication device is associated with at least one pre-paid payment source account. In one example, the wireless communication device is a pre-paid cellular phone and/or is associated with a pre-paid money transfer account. In certain aspects, the wireless communication device may access a pre-directed phone number, e.g., *55, to access a money transfer service provider. Once connected to a money transfer service provider, a user may initiate a money transfer via the wireless device, which may optionally be paid to a payee in-person at a money transfer service provider location.

In accordance with a first aspect of the invention, a method for performing a money transfer transaction via a wireless communication device is provided. The method generally comprises, a user accessing a money transfer service provider from a wireless communication device and providing personal identification information to the money transfer service provider via the wireless communication device. In accordance with the invention, at least a portion of the personal identification information is automatically provided based on user profile information associated with the wireless communication device account. The money transfer service provider then verifies personal identification information based at least in part on the user profile information associated with the wireless communication device account.

The user further provides money transfer instructions to the money transfer service provider via the wireless communication device. The money transfer instructions generally include at least the amount of the money transfer transaction, the recipient of the money transfer transaction, and the destination of the money transfer transaction. In certain embodiments, the recipient of the money transfer transaction may be an individual. In other embodiments, the recipient may be a financial services organization, such as a bank, a credit card, etc. In yet other embodiments, the recipient may be a consumer service provider, such as a utility company, wireless telecommunication service provider, restaurateur, consumer retail store, etc. The destination of the money transfer transaction may be, e.g., a geographic location, bank account information, credit card account information, consumer service provider account information (e.g., utility company account information, wireless telecommunication service provider account information, restaurateur account information, consumer retail store account information, etc.).

The money transfer service provider then verifies the at least one payment source account status associated with the wireless communication device and determines if the amount of the money transfer transaction requested may be charged against the payment source account associated with the wireless communication device account. In accordance with the invention, the money transfer service provider authorizes the money transfer transaction if the at least one payment source account associated with the wireless communication device may be charged the requested amount or declines the money transfer transaction if the at least one payment source account associated with the wireless communication device may not be charged the requested amount. In certain embodiments, the at least one payment source account is a pre-paid money transfer account.

If authorized, the money transfer service provider charges the at least one payment source account associated with the wireless communication device at least the amount of the money transfer transaction, and transmits information concerning the money transfer transaction to a money transfer facilitator for completion of the money transfer transaction.

Systems for performing money transfer transactions via a wireless communication device are also provided.

These and other aspects of the invention will become apparent upon reading the detailed description of the invention.

DETAILED DESCRIPTION OF THE INVENTION

Figure 1:
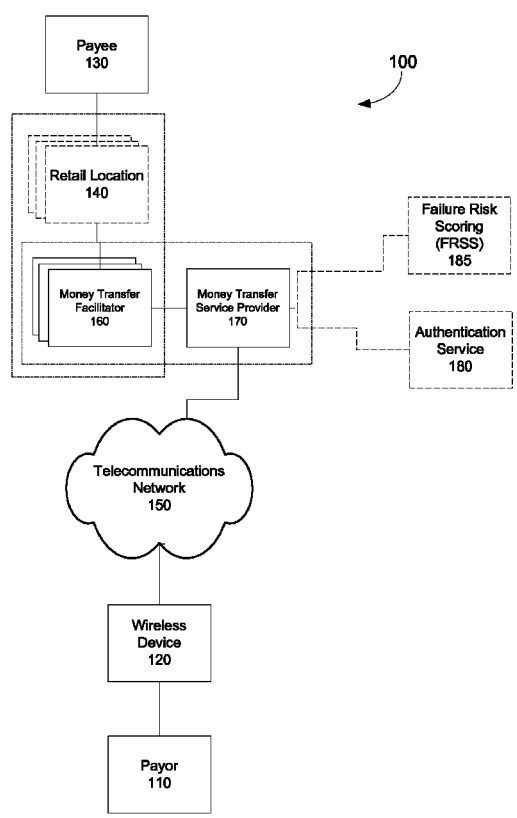
FIG. 1 illustrates a money transfer system in accordance with an embodiment of the invention, with optional components indicated with a dashed line.

Various detailed embodiments of the present invention are disclosed herein; however, it is to be understood that the disclosed embodiments are merely exemplary of the invention, which may be embodied in various forms.

The present invention generally provides systems and methods for performing money transfer transactions via a wireless communication device, such as a cellular phone, blackberry, palm pilot, or similar personal communication device. In accordance with the invention, the wireless communication device is associated with, or automatically linked to, at least one payment source account (i.e., the wireless communication device is associated with at least one payment source account that may be automatically charged for payment of account balances, authorized charges, money transfers, etc.). In a preferred embodiment, the wireless communication device is associated with at least one pre-paid payment source account. In one example, the wireless communication device is a pre-paid cellular phone and/or is associated with a pre-paid money transfer account. In certain aspects, the wireless communication device may access a pre-directed phone number, e.g., *55, to access a money transfer service provider. Once connected to a money transfer service provider, a user may initiate a money transfer via the wireless device, which may optionally be paid to a payee in-person at a money transfer service provider location.

In accordance with the invention, once the user accesses the money transfer service provider, the user provides personal identification information to the money transfer service provider via the wireless communication device. To aid in authentication of the user and to minimize fraud, at least a portion of the personal identification information is automatically provided to the money transfer service provider based on user profile information associated with the wireless communication device account, and verified by the money transfer service provider based at least in part on the user profile information associated with the wireless communication device account.

Money transfer instructions are also provided to the money transfer service provider via the wireless communication device. The money transfer instructions generally include at least an amount of the money transfer transaction, a recipient of the money transfer transaction, and the destination of the money transfer transaction. The money transfer service provider then verifies the status of the at least one payment source account associated with the wireless communication device to determine if the amount of the money transfer transaction requested may be charged to at least one of the payment source accounts associated with the wireless communication device If the charge is verified, the money transfer service provider then authorizes the money transfer transaction, and charges at least the amount of the money transfer transaction to the verified payment source account(s). The money transfer service provider then transmits information concerning the money transfer transaction for completion of the money transaction.

More particularly, in certain embodiments, the recipient of the money transfer transaction may be an individual. In other embodiments, the recipient may be a financial services organization, such as a bank, a credit card, etc. In yet other embodiments, the recipient may be a consumer service provider, such as a utility company, wireless telecommunication service provider, restaurateur, consumer retail store, etc. The destination of the money transfer transaction may be, e.g., a geographic location, bank account information, credit card account information, consumer service provider account information (e.g., utility company account information, wireless telecommunication service provider account information, restaurateur account information, consumer retail store account information, etc.). As such, in certain embodiments, the money transfer transaction may be made directly to the bank account of a financial services organization, a consumer service provider, or an individual; may be made directly to the account of another wireless communication device; may be made at a retail location in proximity of the geographic location of an individual recipient; may be used to pay a consumer bill; etc.

In certain aspects, the at least one payment source account may be a pre-paid wireless communication device account that is used to pay for usage of the wireless communication device. Such payment source accounts may be purchased and "charged" with value at the time of purchase and activation of the wireless communication device, or may be "topped-up" after purchase and activation of the wireless communication device as desired by the user, as known in the art.

In alternative embodiments, the payment source account may be pre-paid money transfer account which is associated with the wireless communication device. Again, such pre-paid money transfer accounts may be purchased and "charged" with value at the time of purchase and activation of the wireless communication device, or may be "topped-up" after purchase and activation of the wireless communication device as desired by the user. By way of example, a stored value card or instant issue debit card may be purchased at a retail location to "top-up" a pre-paid money transfer account associated with a wireless communication device, and paid for at the retail location via cash, check, credit card, debit card, automated teller machine (ATM) card, etc. Alternatively, the value of a pre-paid money transfer account may be increased via telephone or on-line "top-up" services using credit card, debit card, ATM card, etc.

In certain embodiments, a risk related to a likelihood that the transaction will complete successfully may also be evaluated. For instance, the personal identification information of a payor may be evaluated and authenticated. Validating that the payment source account information is associated with a valid user of the wireless communication device may also be performed.

Referring first to FIG. 1, a block diagram of an embodiment of a money transfer system 100 of the invention is shown. In this embodiment, the payor 110 can send money to a payee 130 that is optionally available for pick-up at any of a number of retail locations 140. Depending on authorization, the money may be available in a few minutes with automated authorization or a few hours with manual authorization. In this way, the payor 110 can make money available to the payee 130 in 10-15 minutes despite any large geographical separation between the payor 110 and payee 130. Included in the money transfer system 100 are a wireless communication device 120, a telecommunication network 150, a money transfer service provider 170, an optional failure risk scoring service (FRSS) 185 and authentication service 180, money transfer facilitator 160, and optionally one or more retail location(s) 140.

The payor 110 uses a wireless communication device 120 to contact the money transfer service provider 170 over a telecommunication network 150, e.g., using a predirected telephone number such as *55. The telecommunication network 150 may be any suitable telecommunication network appropriate for use by wireless communication devices, such as cellular phones. In various embodiments, the wireless communication device 120 may be any suitable wireless communication device associated with at least one payment source account known in the art, such as a cellular phone associated with at least one pre-paid account source, and may include a web browser function or custom application software to facilitate money transfer requests.

The money transfer service provider 170 manages operation of the money transfer system 100. Once connected to the money transfer service provider 170 via the telecommunication network 150, the payor 110 provides personal identification information to authenticate identity as a valid user of the wireless communication device and as a authorized user of the at least one payment source account associated with the wireless communication device to which the money transfer transaction will be charged. The payor 110 also provides money transfer instructions, such as payee information and transaction amount information, to initiate a transfer to payee 130.

In authenticating the identity of payor 110, at least some of the personal identification information is provided to the money transfer service provider 170 automatically based on user profile information associated with the wireless communication device 120. Automatic information provided based on a user profile associated with the wireless communication device may include, e.g., wireless communication device owner identification information, owner identification verification information, device account billing information, pre-authorized money transfer service user information, pre-authorized money transfer recipient information, etc. In certain embodiments, the user profile information which may be automatically obtained by the money transfer service provider 170 may include the wireless communication device phone number (e.g., as obtained by automated methods such as automated number identification (ANI)), account information associated with the wireless communication device, a user ID, a password, a PIN, a driver's license number, a payor's name, an address, a social security number or portion thereof, a maiden name, a mothers maiden name, an age, a date of birth, and/or other personal identification information.

The money transfer service provider 170 may authenticate the identify of payor 110 by, e.g., verifying the personal identification information provided by payor 110, including the information automatically provided based at least in part on user profile information associated with the wireless communication device 120. The personal identification information may be verified in any suitable manner known in the art. For instance, the payor 110 may provide a PIN, password, biometrics reading, or other personal information associated with the user profile to the money transfer service provider 170 to verify identify. In other embodiments, the payor 110 may provide secondary personal identification information in addition to the information automatically provided via the wireless communication device user profile. The secondary personal identification information may then be verified, e.g., as described below with reference to the FRSS 185 system.

Following identity verification and authentication of payor 110 (or in connection with authentication of payor 110), payor 110 will generally provide money transfer instructions to the money transfer service provider 170 via the wireless communication device 120. The money transfer instructions include at least the amount of the money transfer transaction, the recipient, i.e., payee 130, of the transaction, and optionally the physical location of the payee 130 and/or payment account associated with the payee 130. In certain embodiments, the instructions may generally include a payee identifier to indicate the recipient of the transaction. The payee identifier can be any group of characters that identifies the payee 130, such as a name, an e-mail address, a test phrase, an account number, and/or an identification number. Payee identifier information may also include the physical, i.e., geographic, location of the recipient. Again, in certain non-limiting examples, payee 130 may be an individual, a financial services organization (e.g., a bank, a credit card, etc.), or a consumer service provider, (e.g., a utility company, wireless telecommunication service provider, restaurateur, consumer retail store, etc.) Further, if desired, payee information and/or payee identifier information may be obtained from the memory of the wireless communication device, e.g., the address book of the wireless communication device. In certain embodiments, the wireless communication may include a custom application software, as mentioned above, which includes instruction requests to the payor regarding obtaining payee identification information from the wireless communication device address book.

The money transfer transaction instructions may be provided in any suitable manner, such as text messaging, interactive voice response (IVR), direct verbal interaction with a customer service representative (CSR), an internet-based browser, and combinations thereof. Further, the instructions may, in part, be provided based on information stored in the user profile associated with the wireless communication device 120. For instance, payee identifier information may be stored in a user profile for quick retrieval during money transfer transactions. In other embodiments, payee identifier information may be obtained by automatic methods such as ANI look-up. For instance, following completion of a phone call using the wireless communication device, a payor 110 may connect with a money transfer service provider 170 and request a money transfer transaction, wherein a payee 130 is identified as the person associated with the last number dialed or the last call received. Automatic methods such as ANI may then be used to obtain information about the payee 130 based on the call log information associated with the wireless communication device user profile.

During the course of the money transfer transaction, the money transfer service provider 170 verifies the status of the at least one payment source account associated with the wireless communication device 120. The status of the payment source account may be verified based at least in part on information in the user profile. In certain aspects, verification of payment source account status including authentication of the account. During authentication of the payment source account, the money transfer service provider 170 authenticates the payor 110 as an authorized user of the account, i.e., as a person authorized to charge against the account. By way of non-limiting example, the account may be authenticated based on, e.g., PIN, password, account name, maiden name, mother's maiden name, zip code, etc. The money transfer service provider 170 may authenticate the account at any time following the point when the payor 110 accesses the money transfer service provider 170 via the wireless communication device 120. For instance, the money transfer service provider 170 may authenticate the account during payor 110 verification and authentication. Alternatively, the account may be authenticated in connection with the final steps of account verification described below, following payor 110 verification.

The payment source account information associated with the wireless communication device may include a pre-paid account, e.g., paid with any form of tender at a retail location, or may be a credit/debit account or bank account linked to the wireless communication device with automatic charging through the wireless communication device account. Again, the pre-paid account may be a pre-paid money transfer account.

During account verification, the money transfer service provider 170 also determines if the amount of the money transfer transaction requested may be charged to payment source account associated with the wireless communication device 120. If the charge is verified, the money transfer service provider 170 then authorizes the money transfer transaction, and charges at least the amount of the money transfer transaction to the payment source account. In certain embodiments, for in-person pick up, the money transfer service provider 170 then transmits information concerning the money transfer transaction to an associated money transfer facilitator 160 at a location in proximity to the recipient (e.g., to a retail location 140 associated with money transaction service provider in proximity to the location of the recipient) for completion of the money transaction.

By way of example, payment may be made to the payee 130 at a retail location 140. Examples of retail locations include Western Union™ locations, check cashing store fronts, payday loan stores, currency exchanges, bill payment stores, banks, etc. These retail locations 140 are arranged in an affiliate network such that the payor may specify any location 140 for making the money available. In some embodiments, the payee 130 does not have a specified retail location 140, but can receive the money at any retail location 140. The retail location 140 verifies the payee is properly associated with the identifier specified by the payor 110. In some cases, this may involve asking for a test phrase or password from the payee or checking identification in the conventional manner. Some embodiments may use biometric information to further verify the identity of the payee 130. In other embodiments, the money transfer transactions may fund directly into the account of a payee 130, rather than being set up for an in-person pick up at a retail location 140. For example, the money transfer may transfer directly into a bank account, credit card account, consumer service provider account (e.g., utility company account, wireless telecommunication service provider account, restaurateur account, consumer retail store account, etc.) of payee 130. In accordance with certain such embodiments, the money transfer may be used for bill pay purposes.

To reduce the risk that a transaction will not be successfully performed and that the payment transfer will not settle, the FRSS 185 and the authentication service 180 may optionally be used. The FRSS 185 scores the risk the transaction will result in a charge/debit card chargeback or unauthorized payment source account charge. Some or all of the payor information, transaction information and payment source account information is passed to the FRSS 185, which produces a numerical score. Additionally, the wireless communication device account/phone number used by the payor 110 is passed to the FRSS 185 such that an user profile information associated with the wireless communication device 120 can be determined and compared against the payor provided information. The FRSS 185 uses regression analysis against historical information on other transactions and/or information gathered outside the money transfer system 100 to produce the numerical score. The money transfer service provider 170 processes the score to decide if the transaction should progress further, fail or be verified manually by a human operator.

After each transaction or in a periodic batch, information on transactions is passed to the FRSS 185 to update the historical information. Included in the historical information is a failure risk score, an authentication score, a settlement result, the payor information, the transaction information, and the source information. The historical information could also include reason codes from the scoring processes to explain reasons for the scores. This embodiment uses a CCScan™ product available from Shared Global™ for the failure risk scoring service 185. In this embodiment, updating of the historical information allows the failure risk scoring to adaptively score risk. In Table I below, possible reason codes or response codes for one embodiment are shown.

TABLE I

| Response Code | Code Description |
|---|---|
| 01 | Important Application Data Missing |
| 02 | Deceased Social Security Number (SSN) |
| 03 | SSN Issued Prior to Date of Birth |
| 04 | Possible Stolen Identity Fraud |
| 05 | Possible Move-In Fraud |
| 06 | Invalid or Unissued SSN |
| 07 | Potentially Disconnected Telephone Number |
| 08 | Invalid Telephone Number |
| 09 | Telephone Number is Pager |
| 10 | Telephone Number is Assigned to Mobile Service |
| 11 | Invalid Address |
| 12 | Zip Code Assigned to Post Office Box Only |
| 13 | Address has Suspect Apartment Unit Designation |
| 14 | Higher Risk Commercial or Institutional Address |
| 15 | Higher Risk Commercial or Institutional Telephone Number |
| 16 | Telephone Number Zip Code Mismatch |
| 17 | Full Name and Address Matches on High Risk DM File |
| 18 | Significant Address Matches on High Risk DM File |
| 19 | Unable to Verify Applicant Name, Address, SSN and Telephone Number |
| 20 | Unable to Verify Applicant Name, Address and Telephone Number |
| 21 | Unable to Verify Applicant Name and Telephone Number |
| 22 | Unable to Verify Applicant Name and Address |
| 23 | Unable to Verify Applicant Name and SSN |
| 24 | Unable to Verify Applicant Address and SSN |
| 25 | Unable to Verify Applicant Address |
| 26 | Unable to Verify Applicant SSN |
| 27 | Unable to Verify Applicant Telephone Number |
| 28 | Unable to Verify Applicant Date of Birth |
| 29 | Potential Data Miskey - SSN |
| 30 | Potential Data Miskey - Address |
| 31 | Potential Data Miskey - Telephone Number |
| 32 | Match to Office of Foreign Assets Control (OFAC) |
| 34 | Incomplete Verification |

The authentication service 180 is used to score a risk that the payment source information is not associated with the payor 110 by authenticating the payment source account and payor 110. Fraud often occurs where a payor impersonates another after stealing a wireless communication device 120 and/or payment source account information. The authentication service 180 scores this risk using various databases to check the payor information and the source information. In one embodiment, a First Data Solutions™ product called Fast Informer™ or FraudID™ is used. Other embodiments could use Instant ID Plus™ from Risk Wise™, Clear Commerce™, and/or Retail Decisions™ products. A risk score is produced by the authentication service 180, which is analyzed by the payment enabler 170 to determine if the transaction should be approved, denied or manually verified.

In this embodiment, the authentication service 180 detects fraud based on confirming the identity of the payor 110 and validating the payor information, transaction information and payment source information against databases. This technique addresses at least the following types of fraud: stolen payment source account information, stolen identities, move-in fraud, and created identity fraud. Payor information is validated by checking that the phone numbers and addresses are valid. Also, the payor information, such as the name, address, phone number, social security number, driver's license number, and date of birth, can be checked for consistency against consumer reporting agencies and public record databases. Some embodiments may only collect and check a portion of the social security number. The payor information is checked against high-risk databases, such as phone numbers recently disconnected, consumers that have recently moved from the payor's state, consumers reported as deceased, consumers filing bankruptcy, high-risk addresses (e.g., hotels, campgrounds, correctional facilities, etc.), social security number of a deceased consumer, and social security numbers issued prior to the date of birth. Transaction information and payment source information is scrutinized by checking for first time users of the payment source or the velocity of recent activity with the payment source originating with the money transfer system 100 and elsewhere.

A second test optionally performed by the FRSS 185 can result in generation of other response codes. This second test compares information provided by the payor 110 against historical information from previous transactions. Multiple criteria are used to analyze the provided information. Additional response codes are possible from this analysis. Table II lists the six possible response codes for this embodiment.

TABLE II

| Response Code | Code Description |
|---|---|
| 210 | Negative Account Record |
| 215 | Negative Location History |
| 220 | Account With Chargeback History |
| 225 | Location With Chargeback History |
| 230 | Exceeds Card Profile |
| 250 | Transaction Exceeds Location Profile |

The third test optionally performed by the FRSS 185 involves scoring the information provided by the payor 110 against historical norms. Every new transaction is entered into the FRSS 185 to update the historical database. As chargebacks, non-sufficient funds notices, or other unfavorable settlements are determined that information is used to update the prior recorded transaction information. A numerical score between 0-999 is produced for each presented transaction. One or more score thresholds could be used to trigger such things as declining to fund the transaction online or requiring manual human validation of the transaction. In one embodiment, a score below 336 requires manual validation before the transaction is funded. Although this embodiment has the FRSS 185 performing a different process for assessing the risk of chargeback than that of FIG. 1, various embodiments could mix and match test elements from the above embodiments.

Figure 2:
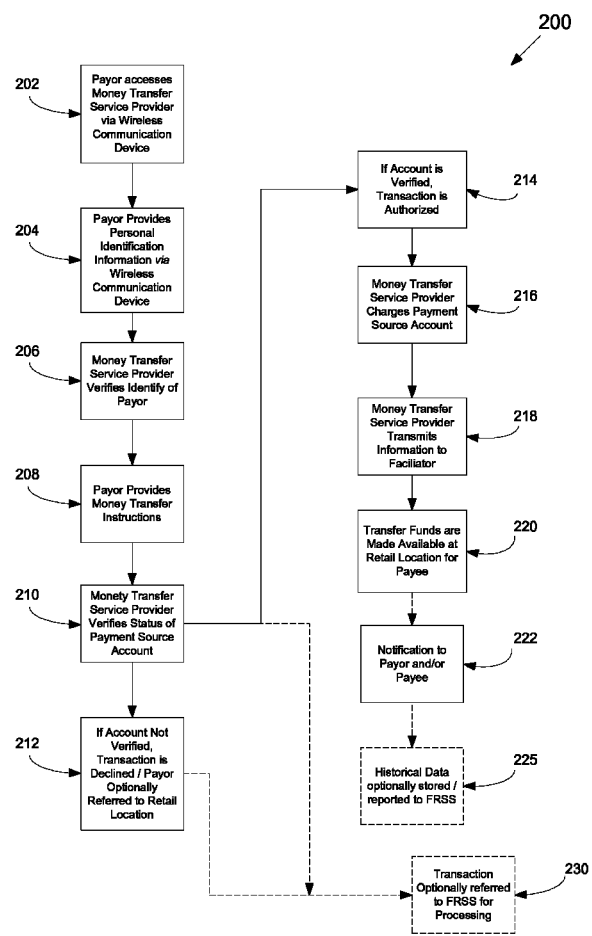
FIG. 2 illustrates a money transfer transaction method in accordance with an embodiment of the invention, with optional steps indicated with a dashed line.

With reference to FIG. 2, a flow diagram of an embodiment of a method for processing a money transfer 200 is shown. The depicted portion of the process 200 begins in step 202 where the payor 110 accesses money transfer service provider 170 using a wireless communication device 120. In certain embodiments, payor 110 may access money transfer service provider 170 via a pre-directed phone number. At step 204, the payor 110 provides personal identification information to the money transfer service provider 170 via the wireless communication device 120. As described above, at least a portion of the personal identification information is automatically provided based on user profile information associated with the wireless communication device account. Following to step 206, the money transfer service provider 170 verifies the identity as a valid user of the wireless communication device based at least in part on the personal identification information provided in step 204, and authenticates the payor 110 as an authorized user of the payment source account(s) associated with the wireless communication device 120 to which the money transfer transaction will be charged.

Following step 206, or in connection with step 206, at step 208, payor 110 provides money transfer instructions to the money transfer service provider 170 via the wireless communication device 120. Again, the money transfer instructions will generally include at least the amount of the money transfer transaction, payee 130 of the transaction, and the "location" of the money transfer transaction.

Moving on to step 210, the payment source account(s) associated with the wireless communication device is/are verified. As described above, step 210 may occur following step 208, or at any time between step 202 and step 208. In some cases, the payor 110 is verified as an authorized user of the payment source account, in connection with step 206. Further, during payment source account authentication, the status of the payment source account(s) is/are verified, e.g., to verify that the account is in good standing and active for charging. In certain embodiments, a balance adequate for the transaction may be verified. Where the payment source information cannot be verified, the money transfer transaction is declined in step 212 and the payor 110 is presented with a message referring him or her to a retail location 140 to fund the transaction. Based upon the payor information, retail locations that are presumed convenient may be suggested.

Where the payment source account information is verified, the money transfer service provider 170 authorizes the money transfer transaction in step 214. Those transactions that are authorized in step 214, proceed to step 216 where the money transfer service provider 170 charges the payment source account(s) associated with the wireless communication device at least the amount of the money transfer transaction, and transmits information concerning the money transfer transaction in step 218 to an associated money transfer facilitator 160 to fund the transfer to payee 130. In certain embodiments, in optional step 220, the funds are made available to the payee 130 at the retail location 140. For automated authentication, this process takes around 10-15 seconds and the entire transaction from beginning to end takes about 10 to 15 minutes.

In certain embodiments, at optionally step 222, the payor 110 and/or payee 130 may be notified when the money transfer transaction has been funded, received, and/or pick-up by payee 130. The notification may be via any suitable notification manner known in the art, such as email, telephone call, text message, letter, and telegram. The payor 110 and/or payee 130 may be notified of other aspects of the money transfer transaction method in a manner similar to those described in U.S. Patent Publication 2005/0119969, which is herein incorporated by reference in its entirety.

Where the funding is initially accepted, processing may optionally continue to step 225 where the historical information for this transaction is stored in a user database(s) (not shown) and is reported out to the FRSS 185. As clearing information is received for payment source accounts, updates may also be stored in the user database(s) and reported out to the FRSS 185.

If the authentication and verifications fail or if the payor 110 has not successfully completed a transaction before, processing may optionally continue to step 2330 where the risk of a chargeback is assessed by the FRSS 185, and optional authentication service 180. Some embodiments only send some the transactions to the FRSS, while others send all transactions to gather more data on the failures. A score is provided by the FRSS 185 along with response codes. The payor 110 is referred to a retail location 140 for scores below a first threshold regardless of reason codes and history. The payor 110 is passed to step 244 for scores above a second threshold (providing they have a favorable history and no negative response code), if not they go to 246 for manual validation and optional authentication by authentication service 180.

In certain embodiments, authentication and verification of the payor 130 and the payment source account may optionally include application of internal business rules of the money transfer system 100. In various embodiments, these business rules may or may not be active. The below Table III shows business rules applied to the payment source account transaction and exemplary active/inactive state for this embodiment. However, any combination of active/inactive status identifier may be used as desired.

TABLE III

| Internal Business Rule | Status |
| --- | --- |
| Check that data required has been entered | Active |
| Check that basic arithmetic functions on the card number can be performed correctly | Active |
| Check that credit card formats are correctly entered | Active |
| Check first 6 digits of card against list of valid bank identification nos. where foreign issued cards are manually validated | Active |
| Check payee name against internal database | Inactive |
| Check payor phone number against internal database | Inactive |
| Check card number against internal database | Active |
| Check payor's account against internal database | Active |
| Check if card is also associated with another user | Active |
| Check if the payor and payee have the same name and are likely the same person which should be treated as a cash advance unless a debit card is specified | Active |
| Check if the phone number is of an illegal format, for example, uses an illegal area code | Active |
| Check if the sender name does not match a name previously entered for the account | Active |
| Check if the payor already has an account by matching name records, e-mail addresses, customer ID, etc. | Active |

If the internal business rules are performed successfully, authentication and verification may also include a velocity check on the number of transactions for a given time period. Various embodiments could trigger manual validation where there are more than three transactions in thirty days, more than three transactions that have gone to manual validation in thirty days, etc.

Where the transaction velocity is not triggered, authentication and verification may include a transaction amount check and an amount velocity check. In this embodiment, manual validation by the manual authentication function may be performed if the transaction amount is, e.g., one thousand dollars or more. Where the payor 110 has sent more than two thousand dollars in the last thirty days, the amount velocity check may be triggered and manual validation of the transaction may be implemented. If over $2,000, the payor may be referred to retail location 140 for funding.

As part of homeland security or other measures, money transfer transaction information may also be checked against a government-supplied hot list of information (not shown). This could include checking any of information provided by the payor 110 against lists or rules provided by the government. For instance, the Office of Foreign Assets Control provides the government hot list, but any number or combination of government hot lists could be checked. Where information matches the hot list, this information may be investigated. The investigation could be performed by the money transfer service provider 170 staff and/or government agents. If the match to the government hot list is determined to be a false positive after proper investigation, processing of the money transfer transaction may continue.

A number of variations and modifications of the invention can also be used. For example, the above embodiments have a number of steps that are preformed to reduce the risk of fraud. Other embodiments could use any subset of these steps to achieve a balance between efficiency and fraud, and certain of the step may be combined to improve efficiency. While in the above embodiment the payee picks up the money at a retail location, other embodiments could use the system to pay any payee in an online transaction where the money is electronically available to the payee.

While the principles of the invention have been described above in connection with specific apparatuses and methods, it is to be clearly understood that this description is made only by way of example and not as limitation on the scope of the invention.

What is claimed is:

1. A method for performing a money transfer transaction via a wireless communication device, said method comprising:

receiving, at a money transfer service provider system, and from a telecommunications network, an initial access request for a money transfer transaction from a user via a wireless communication device communicating on the telecommunications network, wherein:
the wireless communication device is associated with at least one credit account;
the wireless communication device is associated with a wireless communication account maintained by a wireless communication provider system; and
the initial access request includes a biometric reading of a biometric characteristic of the user;

receiving, at the money transfer service provider system, and from the telecommunications network, money transfer instructions from the user via the wireless communication device communicating on the telecommunications network, wherein the money transfer instructions include at least an amount of the money transfer transaction and a recipient of the money transfer transaction;

receiving, at the money transfer service provider system, a biometric record associated with the wireless communication account from the wireless communication provider system;

verifying, with the money transfer service provider system, the status of the at least one credit account and determining if the amount of the money transfer transaction requested may be charged against the credit account;

verifying, with the money transfer service provider system, a velocity of transactions per time does not exceed a particular amount for the user;

causing, with the money transfer service provider system, manual, non-automated, validation of the money transfer transaction to occur when the velocity of transactions per time does exceed the particular amount, wherein validation comprises:
transmitting, from the money transfer service provider system to a failure risk scoring service system, information regarding the money transfer transaction; and
receiving, at the money transfer service provider system from the failure risk scoring service system, a score indicative of a risk of chargeback assessment;

authorizing, with the money transfer service provider system, the money transfer transaction if the at least one credit account may be charged the requested amount and if the biometric reading matches the biometric record;

declining, with the money transfer service provider system, the money transfer transaction if the at least one credit account may not be charged the requested amount or the biometric reading does not match the biometric record;

charging, with the money transfer service provider system, the at least one credit account at least a portion of the amount of the money transfer transaction if the money transfer transaction is authorized; and transmitting information concerning the money transfer transaction from the money transfer service provider system to a money transfer facilitator associated with the money transfer server provider system for completion of the money transfer transaction via provision of funds in-person to the recipient if the money transfer transaction is authorized.

2. The method of claim 1, wherein the money transfer instructions are provided via the wireless communication device using a communication means selected from the group consisting of: text messaging, interactive voice response (IVR), direct verbal interaction with a customer service representative (CSR), an internet-based browser, and combinations thereof.

3. The method of claim 1, wherein the recipient of the money transfer transaction is selected from the group consisting of an individual, a financial services organization, a merchant and a consumer service provider.

4. The method of claim 1, wherein the method further comprises verifying, with the money transfer service provider system, the identity of the user based at least in part on PIN information, password information, biometrics readings, telephone number information associated with the wireless communication device as determined by automatic number identification (ANI), or combinations thereof.

5. The method of claim 1, wherein receiving money transfer instructions including the recipient comprises the money transfer service provider system obtaining, with ANI, the last number dialed or the last call received by the wireless communication device.

6. The method of claim 1, wherein the initial access request is via a pre-directed phone number.

7. The method of claim 1, further comprising the money transfer facilitator making a cash payment available to the recipient at a retail location in geographic proximity to the location of the recipient.

8. The method of claim 1, wherein the user and/or the recipient are notified, by the money transfer service provider system, if and when the money transfer transaction is completed and/or if and when the recipient receives the funds from money transfer transaction.

9. The method of claim 1, further comprising:
verifying, with the money transfer service provider system, a velocity of manually, non-automated, validated transactions per time does not exceed a particular amount; and
causing, with the money transfer service provider system, manual, non-automated, validation of the money transfer transaction to occur when the velocity of manually, non-automated, validated transactions per time does exceed the particular amount.

10. A method for performing a money transfer transaction via a wireless communication device, said method comprising:
receiving, at a money transfer service provider system, and from a telecommunications network, an initial access request for a money transfer transaction from a user via a wireless communication device communicating on the telecommunications network, wherein:
the wireless communication device is associated with at least one pre-paid source account;
the wireless communication device is associated with a wireless communication account maintained by a wireless communication provider system; and
the initial access request includes a biometric reading of a biometric characteristic of the user, collected by the wireless communication device;
receiving, at the money transfer service provider system, and from the telecommunications network, money transfer instructions from the user via the wireless communication device communicating on the telecommunications network, wherein the money transfer instructions include at least an amount of the money transfer transaction and a recipient of the money transfer transaction;
receiving, at the money transfer service provider system, a biometric record associated with the wireless communication account from the wireless communication provider, the biometric record having been previously collected by the wireless communication provider system;
verifying, with the money transfer service provider system, the status of the at least one pre-paid source account and determining if the amount of the money transfer transaction requested may be charged against the pre-paid source account;
verifying, with the money transfer service provider system, a velocity of transactions per time does not exceed a particular amount for the user;
causing, with the money transfer service provider system, validation of the money transfer transaction to occur when the velocity of transactions per time does exceed the particular amount, wherein validation comprises:
transmitting, from the money transfer service provider system to a failure risk scoring service system, information regarding the money transfer transaction; and
receiving, at the money transfer service provider system from the failure risk scoring service system, a score indicative of a risk of chargeback assessment;
comparing, with the money transfer service provider system, the biometric reading with the biometric record to determine if the user submitting the initial access request for the money transfer transaction is the user associated with the wireless communication account;
authorizing, with the money transfer service provider system, the money transfer transaction if the at least one pre-paid source account may be charged the requested amount and if the biometric reading matches the biometric record;
declining, with the money transfer service provider system, the money transfer transaction if the at least one pre-paid source account may not be charged the requested amount or the biometric reading does not match the biometric record;
charging, with the money transfer service provider system, the at least one pre-paid source account at least a portion of the amount of the money transfer transaction if the money transfer transaction is authorized; and
transmitting information concerning the money transfer transaction from the money transfer service provider system to a money transfer facilitator associated with the money transfer server provider system for completion of the money transfer transaction via provision of funds in-person to the recipient if the money transfer transaction is authorized.

11. A method for performing a money transfer transaction via a wireless communication device, said method comprising:
   receiving, at a money transfer service provider system, and from a telecommunications network, an initial access request for a money transfer transaction from a user via a wireless communication device communicating on the telecommunications network, wherein:
      the wireless communication device is associated with at least one source account;
      the wireless communication device is associated with a wireless communication account maintained by a wireless communication provider system; and
      the initial access request includes an identification of the user or the wireless device and a separate fingerprint reading of a fingerprint of the user, collected by the wireless communication device;
   receiving, at the money transfer service provider system, and from the telecommunications network, money transfer instructions from the user via the wireless communication device communicating on the telecommunications network, wherein the money transfer instructions include at least an amount of the money transfer transaction and a recipient of the money transfer transaction;
   sending, from the money transfer service provider system, the identification of the user or the wireless device to the wireless communication provider system to request a fingerprint record associated with the wireless communication account;
   receiving, at the money transfer service provider system, in response to the request, the fingerprint record from the wireless communication provider, the fingerprint record having been previously collected by the wireless communication provider and stored in relation to the wireless communication account;
   verifying, with the money transfer service provider system, the status of the at least one source account and determining if the amount of the money transfer transaction requested may be charged against the source account;
   verifying, with the money transfer service provider system, a velocity of transactions per time does not exceed a particular amount for the user;
   causing, with the money transfer service provider system, validation of the money transfer transaction to occur when the velocity of transactions per time does exceed the particular amount, wherein validation comprises:
      transmitting, from the money transfer service provider system to a failure risk scoring service system, information regarding the money transfer transaction; and
      receiving, at the money transfer service provider system from the failure risk scoring service system, a score indicative of a risk of chargeback assessment;
   authorizing, with the money transfer service provider system, the money transfer transaction if:
      the at least one source account may be charged the requested amount,
      the score provided by the failure risk scoring service system is greater than a threshold value, and
      the fingerprint reading matches the fingerprint record;
   declining, with the money transfer service provider system, the money transfer transaction if:
      the at least one source account may not be charged the requested amount, or
      the fingerprint reading does not match the fingerprint record;
   charging, with the money transfer service provider system, the at least one source account at least a portion of the amount of the money transfer transaction if the money transfer transaction is authorized;
   sending instructions for display on the mobile device referring the user to a retail location of a money transfer service to complete the money transfer transaction if the money transfer transaction is declined; and
   transmitting information concerning the money transfer transaction from the money transfer service provider system to a money transfer facilitator associated with the money transfer server provider system if the money transfer transaction is authorized.

* * * * *